E. CASSCA.
SOUND BOX FOR PHONOGRAPHS OR THE LIKE.
APPLICATION FILED JUNE 11, 1917. RENEWED APR. 12, 1920.

1,342,663.

Patented June 8, 1920.

INVENTOR
Erwin Cassca
By Frank Schraeder
Attorney.

E. CASSCA.
SOUND BOX FOR PHONOGRAPHS OR THE LIKE.
APPLICATION FILED JUNE 11, 1917. RENEWED APR. 12, 1920.

1,342,663.

Patented June 8, 1920.
3 SHEETS—SHEET 2.

INVENTOR.
Erwin Cassca
By Frank Schraeder
Attorney.

E. CASSCA.
SOUND BOX FOR PHONOGRAPHS OR THE LIKE.
APPLICATION FILED JUNE 11, 1917. RENEWED APR. 12, 1920.
1,342,663.
Patented June 8, 1920.
3 SHEETS—SHEET 3.
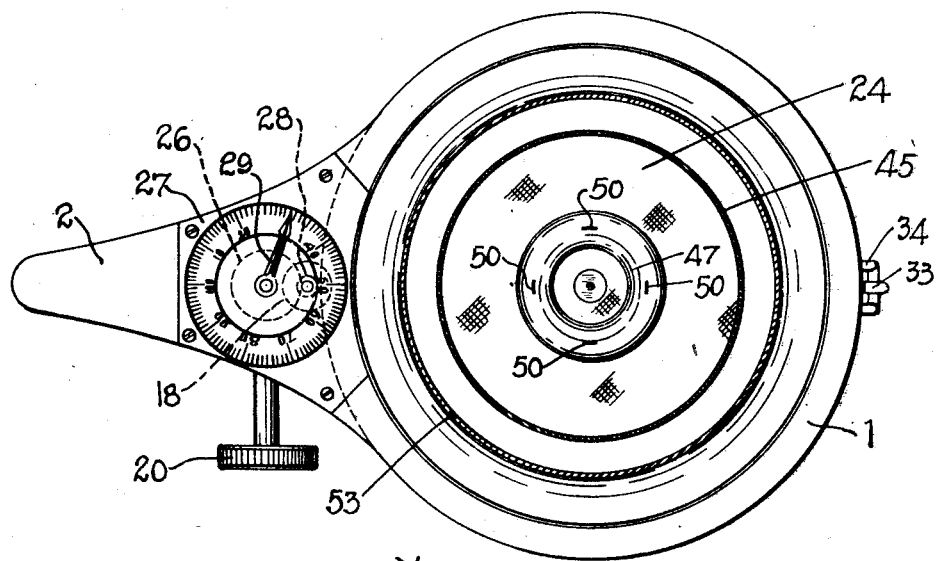
FIG. 5.
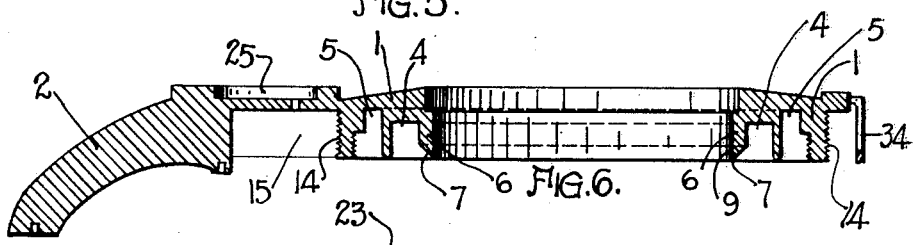
FIG. 6.
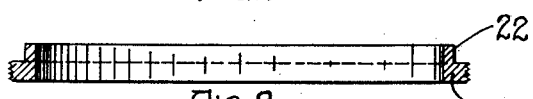
FIG. 7.
FIG. 8.
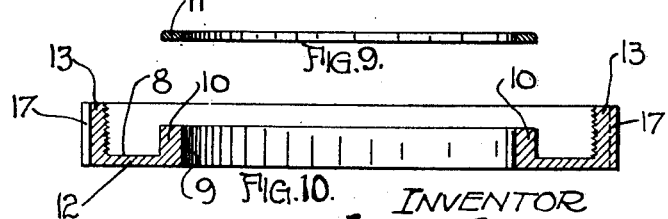
FIG. 9.
FIG. 10.
INVENTOR
Erwin Cassca
By
Frank Schraeder
Attorney.

UNITED STATES PATENT OFFICE.

ERWIN CASSCA, OF SAN FRANCISCO, CALIFORNIA.

SOUND-BOX FOR PHONOGRAPHS OR THE LIKE.

1,342,663.  Specification of Letters Patent.  Patented June 8, 1920.

Application filed June 11, 1917, Serial No. 173,925. Renewed April 12, 1920. Serial No. 373,385.

*To all whom it may concern:*

Be it known that I, ERWIN CASSCA, a citizen of the Republic of Czechoslovakia, residing at San Francisco, in the county of San Francisco and State of California, have invented certain new and useful Improvements in Sound-Boxes for Phonographs or the like, of which the following is a specification.

This invention relates to sound boxes for phonographs or the like, wherein means are provided for adjusting the tension of the diaphragm; a floating weight arranged to absorb local vibrations, and a sound modifier employed to receive the diaphragm vibrations at the point of maximum amplitude.

In playing records of distinctly different character, as for example in the reproduction of a band piece and the reproduction of a violin piece, it has been found that for well understood reasons, the adjustment of the tension of the diaphragm materially aids in the correctness of the reproduction, and it is with a view to placing within the manual control of the user a diaphragm adjusting means, that the principal feature of the present invention is concerned.

The improved diaphragm adjusting means of the present invention, is constructed to be manually operated, and to indicate through a suitable scale or other indicator, the condition of the diaphragm under each and every adjustment, whereby, with a knowledge of the piece to be played, the user may accurately adjust the diaphragm tension for that particular piece.

The invention also contemplates the use of a floating weight, and the connection of the stylus lever thereto, the said lever being connected with the diaphragm through an intermediate lever and flexible connector, whereby to absorb local vibrations and to reproduce through the diaphragm the record vibrations, to increase the accuracy and tone of the reproduction.

The invention, further contemplates a tone modifier through the use of which the sound vibrations from the diaphragm are taken at the point of maximum amplitude, the minor vibrations being absorbed or dampened to thereby avoid the interference which would otherwise impair the reproduction.

The invention in the preferred form is illustrated in the accompanying drawings, in which.

Figure 1:
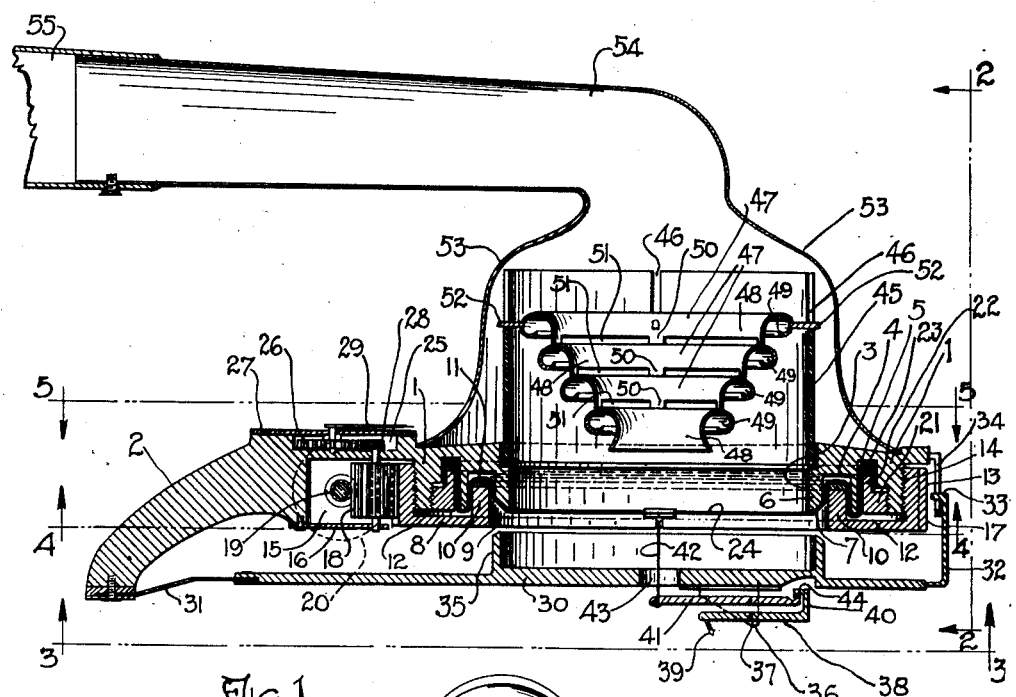
Figure 1 is a view in vertical section of the improved sound box.
Figure 2:
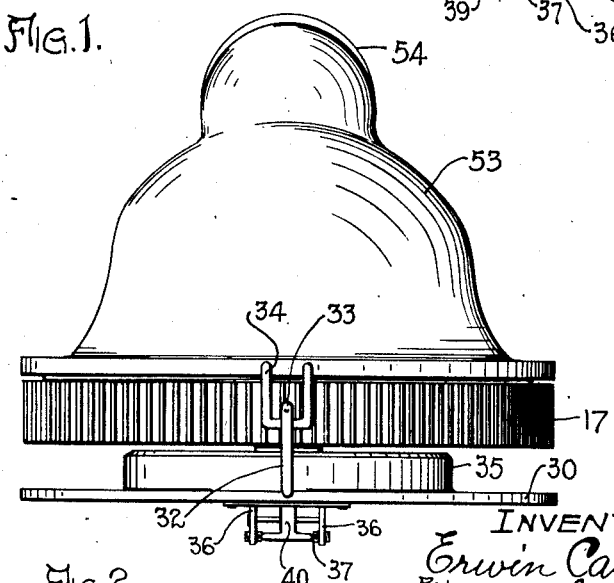
Fig. 2 is an end elevation of the same, taken from line 2—2 of Fig. 1.
Figure 3:
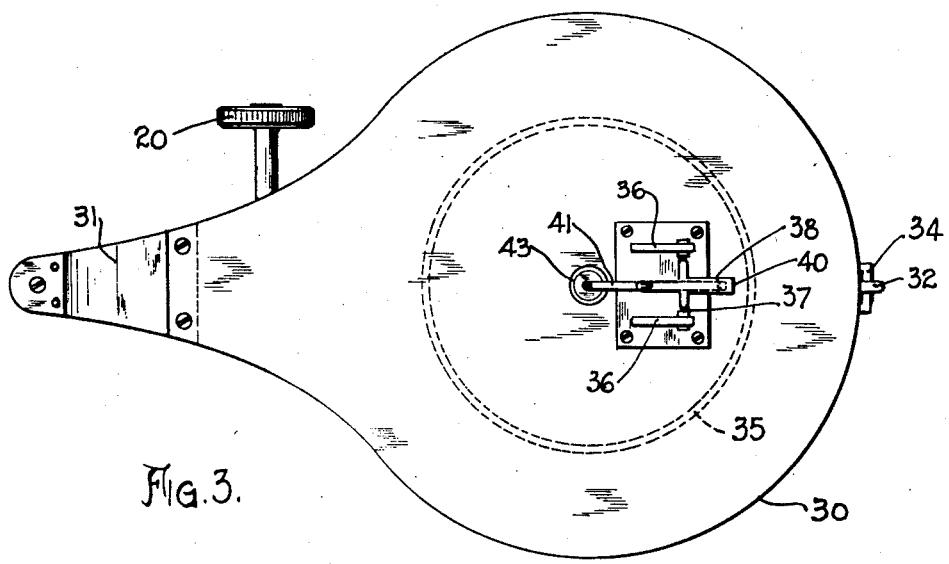
Fig. 3 is a bottom view taken from line 3—3 of Fig. 1.
Figure 4:
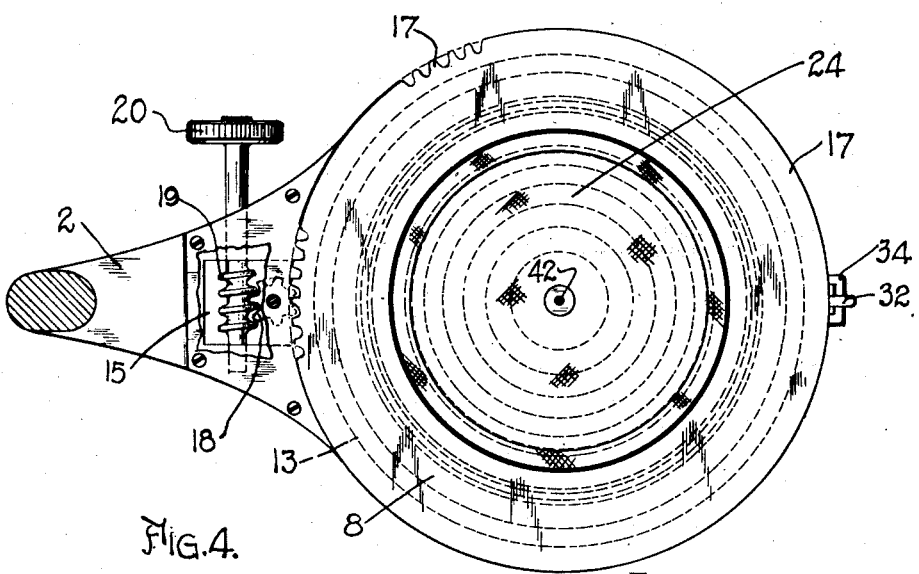

Figs. 4 and 5 are sectional views taken respectively on lines 4—4 and 5—5 of Fig. 1.

Figs. 6 to 10, inclusive, show in section, respectively, the base, the securing bearing strip, the securing ring, the adjusting bearing strip, and the adjusting ring.

The improved sound box is here shown as comprising a base 1, approximately circular in plan, and having a lateral arm 2 projecting therefrom. The base 1 is provided approximately centrally thereof with a sound or diaphragm receiving opening 3, and concentric with said opening, the base is formed in its lower surface with an inner annular channel 4, hereinafter termed the adjusting channel, and an outer concentric channel 5 hereinafter termed the securing channel. The annular wall 6, between the diaphragm opening and the adjusting channel, is upwardly and outwardly inclined at its lower edge, as at 7, to present an acute bearing edge for the diaphragm. An adjusting ring 8 is arranged for coöperation with the base, said ring underlying the base proper and being centrally formed with an opening 9 of a diameter exceeding the diameter of the diaphragm opening 3. Immediately beyond the opening 9, the adjusting ring presents an upstanding wall 10, adapted to fit somewhat loosely in the adjusting channel 4 of the base, the upper edge of the annular wall 10 having, preferably, a rounded bearing strip 11 over which the diaphragm may be passed without liability of injury to the diaphragm in movement due to adjustments. Beyond the wall 10 the adjusting ring is in the form of a plate 12 underlying the base, the peripheral edge of the plate having an upstanding annular wall 13 arranged for threaded connection at 14 with the edge wall of the base, the threaded connection thus described permitting the movement of the adjusting ring toward and from the base in the rotation of said ring.

The arm 2 immediately beyond the threaded wall of the base is cored out to present a chamber 15, the said chamber opening from below and being adapted to be closed by a removable plate 16. The edge wall 13 of the adjusting ring is exteriorly formed to provide gear teeth 17, and in the chamber 15 is mounted a gear pinion 18, supported for rotation in the top wall of the chamber 15 and in the removable plate 16. A worm shaft 19 is rotatably supported in the opposing walls of the chamber 15 at right angles to the gear 18 the worm being in mesh with the gear and the worm shaft beyond the chamber being provided with an operating disk or button 20.

The lower portion of the securing channel 5 is laterally enlarged, and a securing ring 21 is arranged in said channel, having a lateral portion threaded for coöperation with the outer wall of the enlargement, and an upstanding section 22 to fit in the securing channel 5. The section 22 is provided on its upper edge with a ring or other bearing strip 23 to directly engage the diaphragm.

The diaphragm 24 is arranged, as usual in sound boxes, to bridge the sound opening 3 of the base. The edges of said diaphragm, for the purposes of the present invention, are passed beneath the bearing edge of the wall 6, over the wall 10 of the adjusting ring, beneath the wall between the channels 4 and 5 and over the section 22 of the securing ring. From this arrangement it is obvious that with the securing ring in holding position, said edge of the diaphragm will be fixed against movement, and that by adjusting the securing ring, through obvious manipulation of the disk 20, the wall 10 of the securing ring may be caused to adjust the tension of the diaphragm to the degree desired.

As the adjusting means is designed particularly for controlling the tension of the diaphragm in accordance with the character of the particular record being played, it is deemed advisable to provide a means for indicating the diaphragm tension. To this end the arm 2 of the base, above the chamber 15 is cored out at 25 to support a gear 26 mounted in the bottom of the cored out portion and a closing plate 27. The gear 26 is driven through a pinion 28 secured upon an extension of the shaft of the pinion 18, and the shaft of the gear 26 is extended through the cover plate 27 and provided with a pointer or other indicator 29. With the cover plate suitably marked, as is preferably intended, it is apparent that even the unskilled operator may adjust the tension of the diaphragm according to such indications on the cover plate and thus obtain a proper adjustment of the diaphragm for the particular record.

The invention also contemplates the use of a floating weight to absorb local vibrations, and for this purpose, a weight arm 30 is secured at one end through a spring strip 31, to the terminal of arm 2 of the base, being provided at the opposite end with a limiting member 32, in the form of a rod having its hooked upper end 33 playing between the side bars of a U-shaped stop 34 secured to the base, the cross bar of the stop preventing possibility of undue movement of the weight arm in one direction, as when the sound box is not in use. The weight arm is provided with an annular wall 35 on the upper side thereof forming a chamber coinciding with sound opening of the base, the edge of said wall, when the sound box is in place on the record approaching the diaphragm to thus confine the diaphragm in a closed space. The weight arm is provided on its lower side with depending ears 36 between which at 37 is pivotally supported a stylus lever 38. This lever carries the usual stylus 39 removably secured at the inner end thereof in any convenient manner. The stylus lever is formed at its outer end with an inverted L-shaped extension 40, the normal horizontal portion of which overlies the outer end of a lever 41 also pivotally supported between the ears and connected at its inner end, preferably through a cord or similar flexible connection 42, with the diaphragm, the weight arm having an opening 43 for the passage of such connection. The coöperating ends of the lever 41 and the overlying portion of the extension 40 of the stylus lever are formed to present similar inclined surfaces 44, so that the movement of the stylus lever in following the record will be imparted to the lever 41 and through this lever to the diaphragm.

To avoid variations in the vibrations of the diaphragm in the reproduction, I provide what I term a sound modifier, in the use of which the vibrations of the diaphragm beyond the point of maximum amplitude thereof are deflected or dampened, with the effect to render the sound waves delivered to the horn more sharp and clear.

To provide for this sound modifier the upper portion of the wall of the sound opening is recessed to receive a sleeve extension 45, the upper edge of which is vertically slotted at diametrically opposite points, as at 46. The sound modifier comprises a series of connected sections 47, of substantially similar structure but varying in diameter. Each section comprises an annular wall 48 having its minimum diameter at a point approximately half the height thereof, the wall flaring above and below said minimum line. The upper edge of the annular wall forming the section is projected downwardly, and formed in a return bend, terminating in spaced relation to the wall, and forming with said wall, an approximately closed annular chamber 49 opening only from beneath. As previously stated, the respective sections, of which four are here shown, are of successively increased diameter from the lower to the upper portion of the modifier, and each of the said sections above the lower sections have, at diametrically opposite points, depending strips 50 by means of which the particular section is secured to the next lowermost section. There is thus provided an annular series of slot like openings 51 between the lower edge of each section and the rounded wall of the next lowermost section, providing for the sound entrance into the modifier at a series of distinct but uniformly arranged points. The uppermost section is provided with projecting pins or strips 52 adapted to seat in the slots 46 of the sleeve 45, whereby the modifier is removably supported within the sleeve in a position directly and centrally above the diaphragm.

The sound box is provided with the usual casing 53 secured to the base on which is mounted the sleeve 45, the casing rising above the sleeve and having an extension 54 to which the horn or other sound conveyer 55 may be removably secured.

Having thus described my invention, what I claim as new, is:—

1. A sound box comprising a base, having a diaphragm opening, said base having inner and outer channels concentric with said opening, a diaphragm mounted on said base over the opening and channels therein, means for securing the edge of the diaphragm in the outermost channel, diaphragm adjusting means operating in the innermost channel, comprising a ring having threaded connection with the base and formed with a projection to engage the diaphragm in said innermost channel, said ring being provided with gear teeth, and a manually operative pinion mounted in the base and engaging said teeth to rotate the ring.

2. A sound box comprising a base, having a diaphragm opening, said base having inner and outer channels concentric with said opening, a diaphragm mounted on said base over the opening and channels therein, means for securing the edge of the diaphragm in the outermost channel, diaphragm adjusting means operating in the innermost channel, comprising a ring having threaded connection with the base and formed with a projection to engage the diaphragm in said innermost channel, said ring being provided with gear teeth, a manually operated pinion mounted in the base and engaging said teeth to rotate the ring and an indicator operated by said pinion.

In testimony whereof I affix my signature.

ERWIN CASSCA.